United States Patent [19]
Rehrig

[11] Patent Number: 5,331,756
[45] Date of Patent: * Jul. 26, 1994

[54] BASKET WALL WITH PLACARD DISPLAY ASSEMBLY

[75] Inventor: Houston Rehrig, Richmond, Va.

[73] Assignee: Rehrig International, Inc., Richmond, Va.

[*] Notice: The portion of the term of this patent subsequent to May 12, 2009 has been disclaimed.

[21] Appl. No.: 951,335

[22] Filed: Sep. 25, 1992

Related U.S. Application Data

[60] Continuation of Ser. No. 579,052, Sep. 7, 1990, abandoned, which is a division of Ser. No. 333,680, Apr. 6, 1989, abandoned, which is a continuation-in-part of Ser. No. 190,065, May 4, 1988, Pat. No. 4,922,639.

[51] Int. Cl.$^5$ .............................. G09F 3/00
[52] U.S. Cl. ..................... 40/308; 280/33.991
[58] Field of Search .................. 40/308, 642; 280/33.991, 33.992

[56] References Cited

U.S. PATENT DOCUMENTS

| | | |
|---|---|---|
| D. 247,953 | 5/1978 | Rehrig . |
| D. 294,419 | 2/1988 | Rehrig . |
| D. 296,259 | 6/1988 | Rehrig . |
| 1,692,999 | 11/1928 | Siegel . |
| 1,906,884 | 5/1933 | Place . |
| 2,101,965 | 12/1937 | Trees . |
| 2,634,020 | 4/1953 | Bartholomew . |
| 2,723,474 | 11/1955 | Minter . |
| 2,797,513 | 7/1957 | Edwards, Jr. . |
| 2,845,729 | 8/1958 | Baumgart . |
| 2,895,243 | 7/1959 | Hummer et al. . |
| 3,024,554 | 3/1962 | Kempher . |
| 3,088,236 | 5/1963 | Hendrick . |
| 3,287,841 | 11/1966 | Spragg et al. . |
| 3,338,464 | 8/1967 | Callihan et al. . |
| 3,609,893 | 10/1971 | Routzahn et al. . |

(List continued on next page.)

FOREIGN PATENT DOCUMENTS 0176168 2/1986 European Pat. Off. .

(List continued on next page.)

OTHER PUBLICATIONS

Supercart International, Inc. Product Brochure for *Supercart* Product (undated). Supercart International, Inc. 40 Kress Street, Regina, Saskatchewan, Canada S4N 5Y3.

Rehrig International, Inc. *Product Sheet for Mini-Carts 800–810, 1800–1810* (undated). Rehrig International, Inc., 901 N. Lombardy St., Richmond, Va. 23220.

Stratmedia -22 photographs.

*Primary Examiner*—Brian K. Green
*Attorney, Agent, or Firm*—Bacon & Thomas

[57] ABSTRACT

For walls of shopping cart baskets, advertising panels which include a plate element and a frame element which fits on the plate element and is releasably held in place thereon by a tab-and-slot arrangement. When held in place, a slot and a card display area which is encircled by the frame element are formed between the plate and frame elements. An advertisement display card can then be easily slid into and out of the display area through this slot. Projections on at least one of the elements keep the carol from falling out of place when in the area. Retrofitted and molded-in panel versions are disclosed. Plate elements of the retrofitted version can be secured together on the inside and outside of the basket wall providing inwardly and outwardly disposed display areas. The molded-in panel has its plate element molded with anti recessed in from the outer surface of a wall of the plastic cart basket, and thus when positioned centrally on a basket side wall with the frame element held thereon, the panel does not prevent the carts from nesting. The frame element of the molded-in version, however, is preferably identical to that of the retrofitted version and is also releasably retained in position using tabs and slots. The frame anti plate elements are both symmetrical about their longitudinal axes.

40 Claims, 19 Drawing Sheets

U.S. PATENT DOCUMENTS

| | | |
|---|---|---|
| 3,677,570 | 7/1972 | Hedu . |
| 3,782,747 | 1/1974 | Hamilton, Jr. . |
| 3,977,558 | 8/1976 | Nilsson . |
| 3,999,774 | 12/1976 | Rehrig . |
| 4,024,660 | 5/1977 | Goto . |
| 4,027,796 | 6/1977 | Martin . |
| 4,176,849 | 12/1979 | Rehrig . |
| 4,217,711 | 8/1980 | Sorenson et al. ................... 40/308 |
| 4,273,346 | 6/1981 | Rehrig . |
| 4,362,244 | 12/1982 | Cornou . |
| 4,376,502 | 3/1983 | Cohen ................................... 40/308 |
| 4,413,434 | 11/1983 | Rupert et al. . |
| 4,484,755 | 11/1984 | Houston . |
| 4,555,123 | 11/1985 | Rehrig . |
| 4,616,839 | 10/1986 | Trubiano ..................... 200/33.991 |
| 4,650,199 | 3/1987 | Rehrig . |
| 4,744,162 | 5/1988 | Okazaki . |
| 4,765,077 | 8/1988 | Rosenthal et al. . |
| 4,927,639 | 5/1990 | Rehrig ................................... 40/308 |
| 5,111,604 | 5/1992 | Rehrig ................................... 40/308 |

FOREIGN PATENT DOCUMENTS

| | | |
|---|---|---|
| 2408346 | 10/1975 | Fed. Rep. of Germany . |
| 3133276 | 3/1983 | Fed. Rep. of Germany . |
| 3340399 | 5/1985 | Fed. Rep. of Germany . |
| 3502791 | 7/1986 | Fed. Rep. of Germany . |
| 8708835.5 | 10/1987 | Fed. Rep. of Germany . |
| 1502910 | 11/1967 | France . |
| 2452142 | 10/1980 | France . |
| 2556117 | 12/1983 | France . |
| 2551012A | 5/1985 | France . |
| 2605130A | 10/1989 | France . |
| 98429 | 11/1980 | Spain . |
| 282478 | 11/1984 | Spain . |
| 284204 | 1/1985 | Spain . |
| 735209 | 8/1955 | United Kingdom . |
| 2217504A | 10/1989 | United Kingdom . |

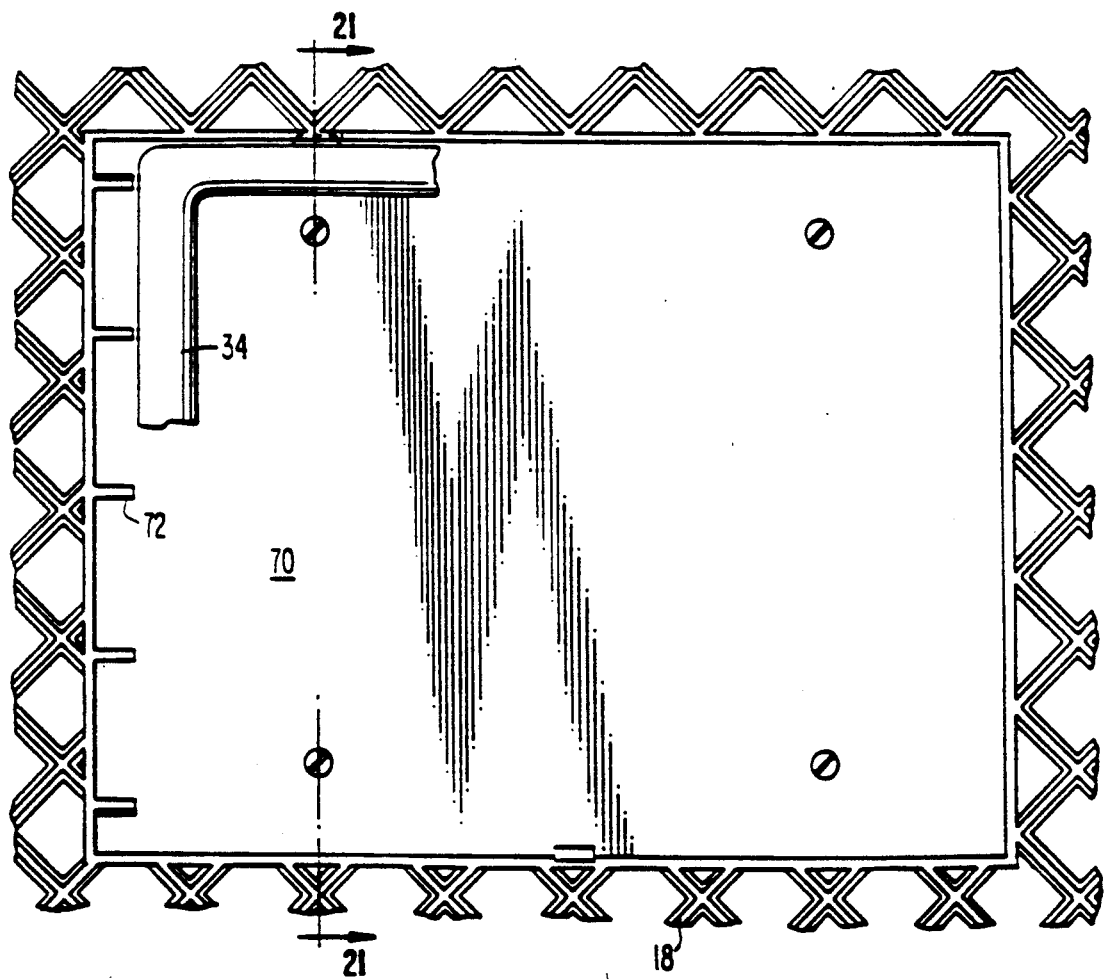

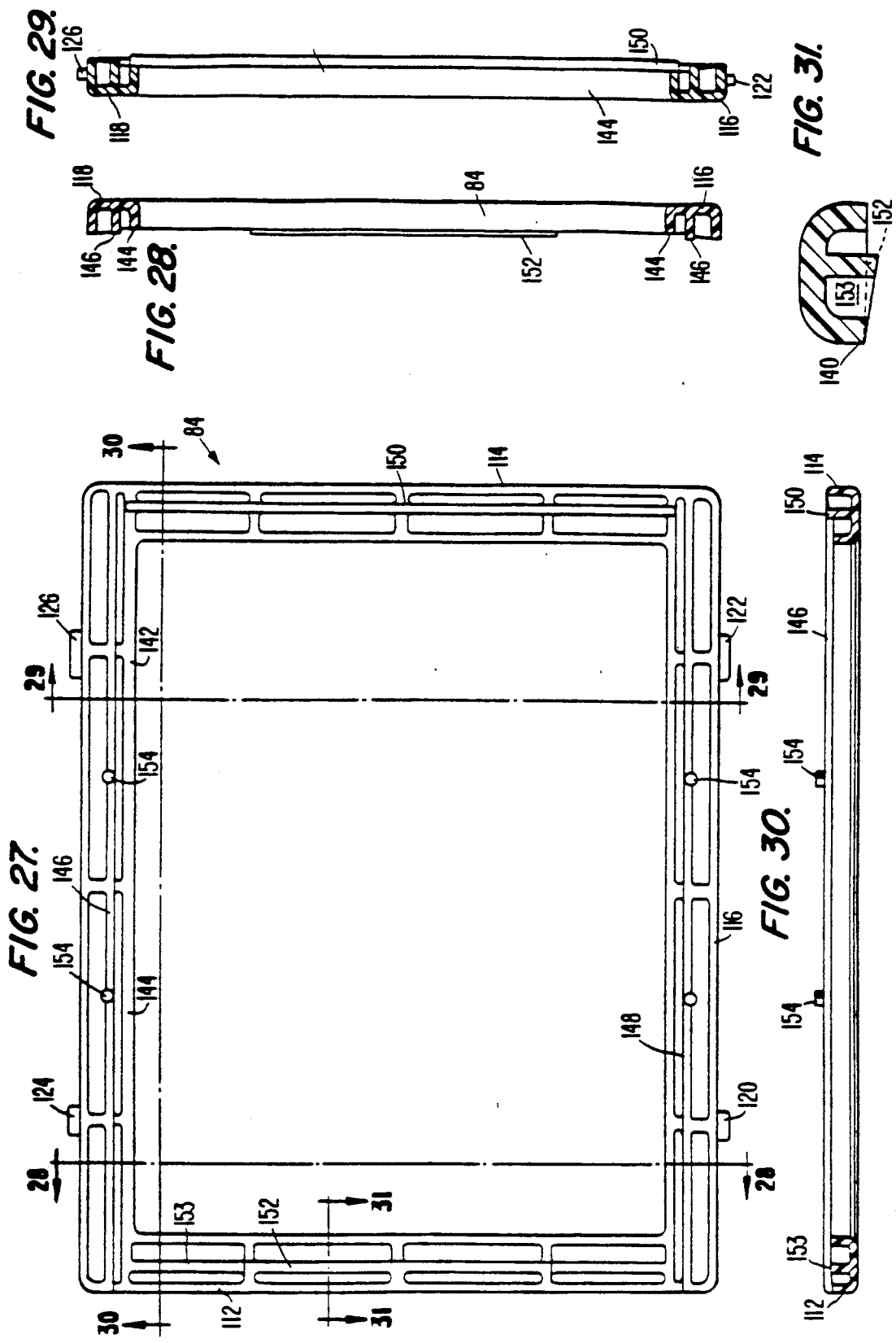

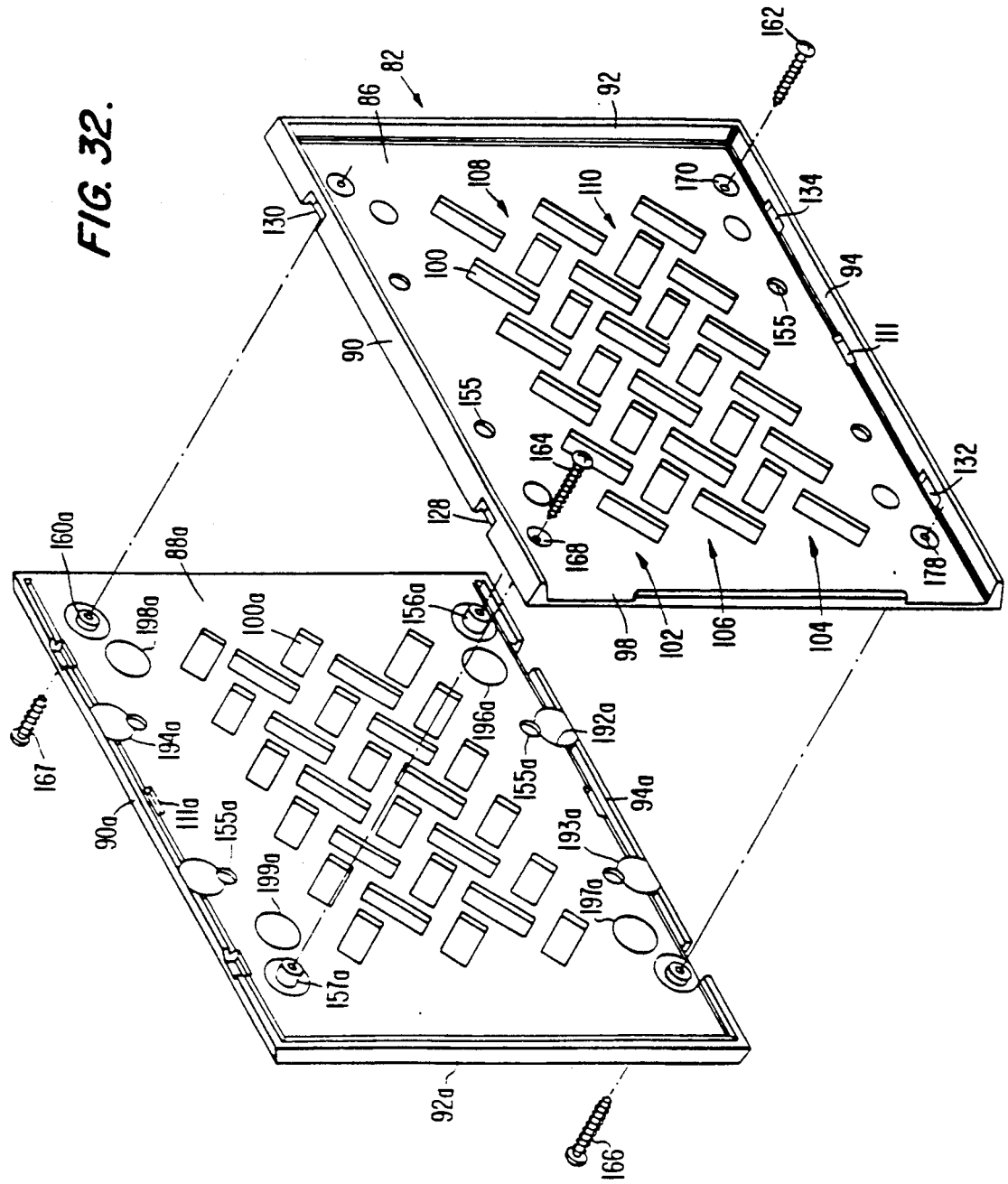

BASKET WALL WITH PLACARD DISPLAY ASSEMBLY

This application is a continuation of application Ser. No. 07/579,052 filed Sep. 7, 1990 now abandoned, which is a division of application Ser. No. 07/333,680 filed Apr. 6, 1989 now abandoned, which is a continuation-in-part of application Ser. No. 07/190,065 filed May 4, 1988, now U.S. Pat. No. 4,922,639 issued May 8, 1990.

BACKGROUND OF THE INVENTION

The present invention relates to carts used in supermarkets and other retail stores. It is further directed to advertising panels which are to be retrofitted on existing shopping carts.

Carts having a frame and a basket used in supermarkets are commonplace. The shopping cart typically has a metal cart frame on which wheels are mounted. A basket is mounted on the cart frame and includes two side walls, a front wall, a back wall, and a bottom portion. The basket may be made from wires welded together to form a gridlike construction. Alternatively, the basket may be molded from plastic. The carts may be formed in various configurations including the standard configuration (see U.S. Pat. No. 3,999,774), jumbo or minicarts, over-the-counter carts (see U.S. Pat. No. 4,273,346) and scanner carts (see U.S. Pat. No. 4,650,199). These patents are all directed to carts having plastic baskets. Regardless of the type of cart and whether the basket is made plastic or wire, the basket is formed almost entirely of an open latticework construction.

The practice of fastening framed advertising panels to shopping carts is becoming widespread and can be a very effective advertising technique. Advertising panels are typically fastened to the outside and inside of the front wall of the shopping cart basket. These panels are used with either wire or plastic baskets. The advertising panels allow easy handling of the advertisement. With existing carts, only retrofitted framed advertising panels may be disposed on the carts. Also, panels may be disposed only on the front walls of the cart baskets because panels disposed on the side walls would prevent nesting of carts and would be damaged when attempting to nest carts together.

One known technique for retrofitting advertising panels onto shopping cart baskets is that of Actmedia Inc, wherein two separate advertising panels are mounted on either side of the front wall of the basket. The panels are attached to each other through the latticework of the front basket wall placing screws through holes in both advertising panels. Each advertising panel is formed of one piece of plastic and includes two elements, namely, a plate and a frame. The plate is rectangular and serves as the backing for the advertisement. The frame is also rectangular and is hingedly formed on the plate. The frame has tabs disposed on its top and side members which fit behind ridges disposed on the top and side peripheral walls of the plate. When the frame is snapped into the plate, the front surfaces of the frame are substantially flush with the protruding edges of the peripheral top, right and left walls of the plate.

However, this apparatus has many disadvantages. First, the frame must be hinged away from the plate to insert and remove advertisements. Additionally, the plastic hinges connecting the frame to the plate often deteriorate and break within a short time. This requires the replacement of the entire advertising panel. Because the frames are integrally formed as one piece with the plates, when the hinge or other components break, the entire panel must be replaced. Moreover, these advertising panels are formed with solid plates by injection molding plastic. As the plates cool, the plastic shrinks, causing the plate to warp. This occurs because the inner portion of the plate cools at a slower rate than the outer portion. Because high density polyethylene shrinks at least 0.20" per inch during cooling, a typical advertising panel would be 3/16 inch smaller after cooling. Slower cooling causes greater shrinkage. However, more rapid cooling on one side of the panel than on the other side causes stresses which further result in an inwardly concaving surface. The advertisement is less securely held within the panel when abutting a curved surface rather than a flat surface. This also detracts from the effectiveness of the advertisement as the concavity causes the advertisement to bow or reflect light and thereby be less readable.

SUMMARY OF THE INVENTION

An improved advertising panel for retrofitting on existing cart baskets and an advertising panel that is molded-in to plastic cart baskets are disclosed.

It is an object of the present invention to provide inexpensive, low maintenance advertising panels that use no hinges, have no moving parts and may be retrofitted on existing cart baskets.

It is another object of the present invention to provide retrofitted advertising panels having holes strategically placed in the plate element to prevent warping and stress distortion during the molding process, to allow easier placement and a flatter display without excess reflection or bowing of the advertisement, and which is easy to clean and maintain.

It is a further object of the present invention to provide a molded-in advertising frame on a cart having a plastic basket and that may be formed on the side walls of the basket without affecting the ability of the carts to nest.

It is a still further object of the present invention to provide a molded-in advertising panel that is durable, and does not have any protrusions which can catch on merchandise, fixtures or customers.

It is another object to provide a molded-in advertising panel in which advertising is visible even when carts are nested and in which the company logo is not obscured.

It is a further object to provide molded-in advertising panels using snap in frame elements that are simple to maintain and replace, that permit easy handling of the advertisement, that use no hinges or other moving parts, and that are low maintenance and inexpensive.

It is a still further object to provide advertising panels usable on the sides of shopping carts which allow the shopping carts to be nested together.

It is another object to provide a novel shopping cart design which allows the logo panel and the advertising panel thereof to be positioned on the same basket cart wall.

It is a further object to provide an improved advertising panel design which allows the advertising cards to be easily inserted into, secured within and removed from the advertising panel through a slot.

It is a still further object to provide a novel advertising panel design which can be cheaply manufactured and easily installed on shopping carts.

It is another object to provide an improved advertising panel design which prevents an advertisement display card therein from slipping downwardly or laterally out of place.

The advertising panels of the present invention are directed to achieving these objects. In one embodiment, the advertising panel is retrofitted on an existing shopping cart basket, either plastic or wire cart baskets. The advertising panel includes two separate components, namely, a frame element and a plate element. There are no moving parts and either of the two components may be separately replaced as desired. The plate element is rectangular and has outer peripheral edge walls disposed around and protruding from the perimeter of the outwardly facing side. These edge walls have tab receiving slots which receive tabs disposed on the frame element. The edge walls strengthen the plate element and prevent the frame element from receiving impacts and damage. Three edge walls—the top, the bottom and one side—are formed to shield the sides of the frame element. The remaining side serves as a receiving opening that permits insertion and removal of advertisements therethrough. This allows the top edge wall to prevent moisture from dripping down and contacting the advertisements, thereby preserving the advertisements. The receiving opening side is formed as a stepped retaining lip. This lip permits easy insertion of the advertisement into the panel while preventing tampering with and loss of the advertisement. Advertisements are easily inserted into the advertising panel through the receiving opening without removing the frame element from the plate portion. The plate element is symmetric around a central horizontal axis. It may be disposed on a cart so that advertisements can be inserted from either the left or the right side.

The plate element is formed with strategically-located oblong holes preferably having maximum widths of one-quarter inch especially when the panels are not mounted back-to-back. This dimensioning prevents objects greater than one-quarter inch in diameter from protruding therethrough and prevents children from poking and damaging the advertisement. The oblong holes prevent warping and stress distortion during the injection molding process thereby allowing a flat plate element to be constructed. This allows the advertisement to easily slide in the panel and permits a superior, flatter display without excess reflection or bowing of the advertisement. These holes also increase the cleanliness of the panel by permitting water drainage. In addition to the tab receiving slots, drainage holes are provided at the intersection of the plate element and the bottom edge wall.

The advertising panels are retrofitted on the front wall of the cart basket. Preferably, two advertising panels are used, one on the inside and one on the outside of the basket front wall. Two plate elements are disposed back-to-back with the front wall of the basket therebetween. The plate elements are screw fastened together through the front wall of the basket to secure the advertising panel to the basket. Holes are formed in projections in corresponding locations on the back of both plate elements. This permits the plate elements to more closely fit within the latticework of the front wall of the basket to better secure the advertising panels to the front wall. The frame element is rectangular, symmetrical around a central horizontal axis, and corresponds in size to the plate element. The frame element fits within the edge walls of the plate element and is secured to the plate element by complementary tabs which fit within the tab receiving slots of the edge walls of the plate element.

The molded-in advertising panel is similar in many respects to the retrofitted advertising panel and similarly uses two components—a frame element and a plate portion. The plate portion is, however, integrally molded with the side walls of the plastic basket. The plate portion can be formed on both of the side walls in addition to the front wall. This embodiment also uses no moving parts and uses a frame element that is identical to that of the retrofitted device. The frame element is rectangular, has tabs, and is replaceable and removable from the shopping cart. Preferably, the molded-in plate portions are formed near the upper rear of the side walls to be visible when carts are nested and to provide adequate space for the company logo. The plate portion is recessed into the outer surface of the basket wall and flush with the inner surface of the basket wall. When the frame element is disposed against the plate portion, the frame element is likewise recessed from the outer surface of the basket wall. The tabs in the frame element fit within tab receiving slots formed within the latticework of the basket walls which forms the outer peripheral edge walls of the plate portion. The top edge wall prevents moisture from dripping down and contacting the advertisements. Drainage holes disposed in the bottom edge wall permit water to drain. The plate portion is also formed with oblong holes which perform the same functions as the oblong holes of the retrofitted advertising panel. Advertisements are inserted and removed through the side of the panel. A series of horizontal ribs is disposed along the length of this side opening. The horizontal ribs permit easy insertion of the advertisement into the panel while preventing tampering with and loss of the advertisement.

The molded-in advertising panels have many advantages over the retrofitted version. With the molded-in panels, advertising panels may be placed on the side walls of the cart basket in addition to the front wall. Since the panel is molded into the basket walls and the frame element is recessed into the outside walls of the basket, the carts can be nested together without damaging the panels. The cost of the molded-in advertising panel is much less than that for a retrofitted panel because the plate portion is part of the cart. Placing panels on the side walls of the basket doubles the advertising capacity of each cart. Advertisements can be inserted or removed from the advertising panels without removing the frame element. This reduces the time needed to change advertisements, which can be significant as advertisements are typically changed every four weeks. Also, became the plate element is not removable, it is less likely to be damaged.

In other words, disclosed herein for walls of shopping cart baskets are advertising panels which include a plate element and a frame element which fits on the plate element and is releasably held in place thereon by a tab-and-slot arrangement. When held in place, a slot and a card display area which is encircled by the frame element are formed between the plate and frame elements. An advertisement display card can then be easily slid into and out of the display area through this slot. Projections on at least one of the elements keep the card from falling out of place when in the area. Retrofitted and molded-in panel versions are disclosed herein. Plate elements of the retrofitted version can be secured together on the inside and outside of the basket wall providing inwardly and outwardly disposed display areas. For the molded-in version the panel has its plate element molded with and recessed in from the outer surface of a wall of the plastic cart basket, and thus when positioned centrally on a basket side wall with the frame element held thereon, the panel does not prevent the carts from nesting. The frame element of the molded-in version, however, is preferably identical to that of the retrofitted version and is also releasably retained in position using tabs and slots. The frame and plate elements are both symmetrical about their longitudinal axes.

Various additional advantages and features of novelty which characterize the invention are further pointed out in the claims that follow. However for a better understanding of the invention and its advantages, reference should be made to the accompanying drawings and descriptive matter which illustrate and describe preferred embodiments of the invention.

BRIEF DESCRIPTION OF THE DRAWINGS

FIG. 20 is a front view of a molded-in advertising panel with a retrofitted advertising panel mounted thereon.

FIG. 27 is a rear elevational view of the frame member of the embodiment of FIG. 24.

FIG. 28 is a sectional view taken along line 28—28 of FIG. 27.

FIG. 29 is a sectional view taken along line 29—29 of FIG. 27.

FIG. 30 is a sectional view taken along line 30—30 of FIG. 27.

FIG. 31 is an enlarged sectional view taken along line 31—31 of FIG. 27.

FIG. 32 is an exploded perspective view of two plate members of the embodiment of FIG. 24.

DETAILED DESCRIPTION OF PREFERRED EMBODIMENTS OF THE INVENTION

Figure 1:
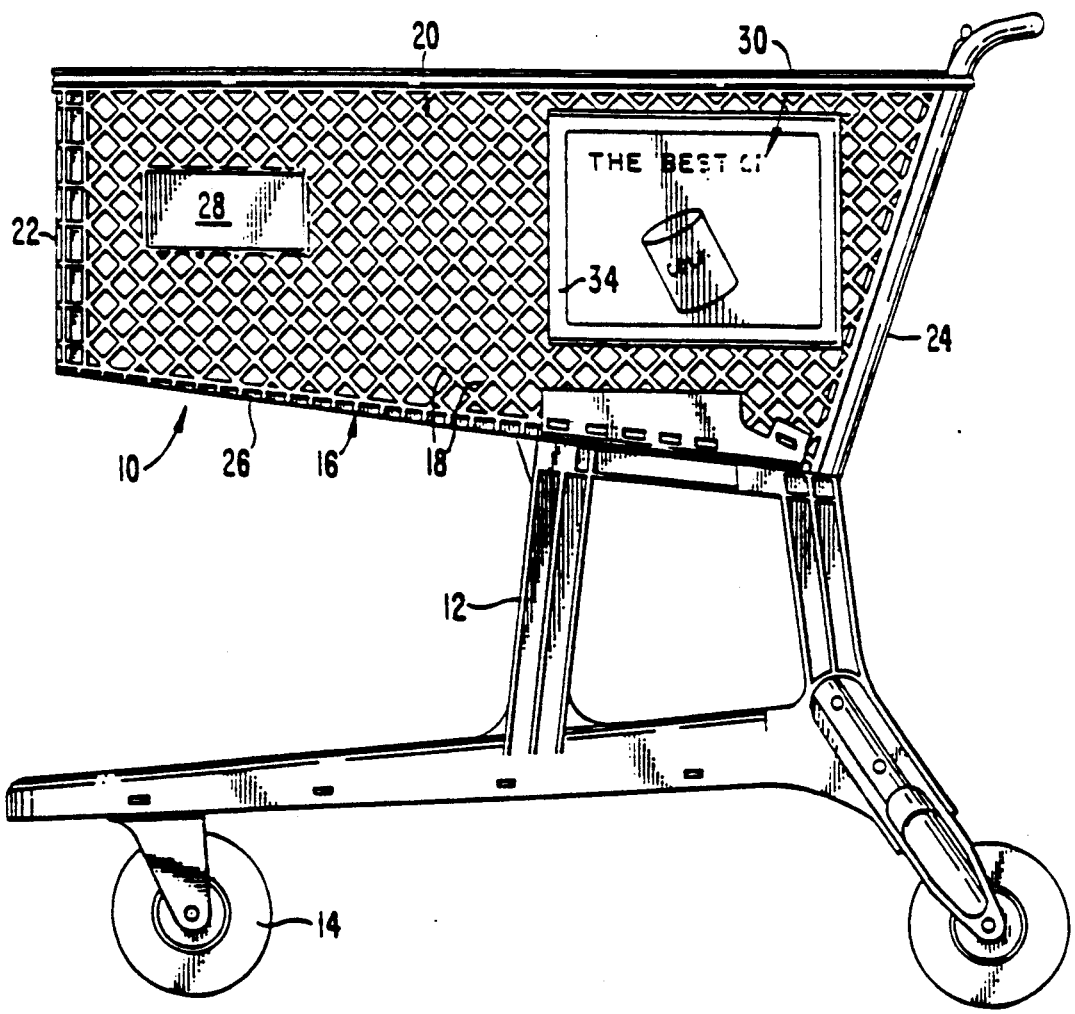
FIG. 1 is a side view of a scanner cart with molded-in advertising panels of the present invention.
Figure 2:
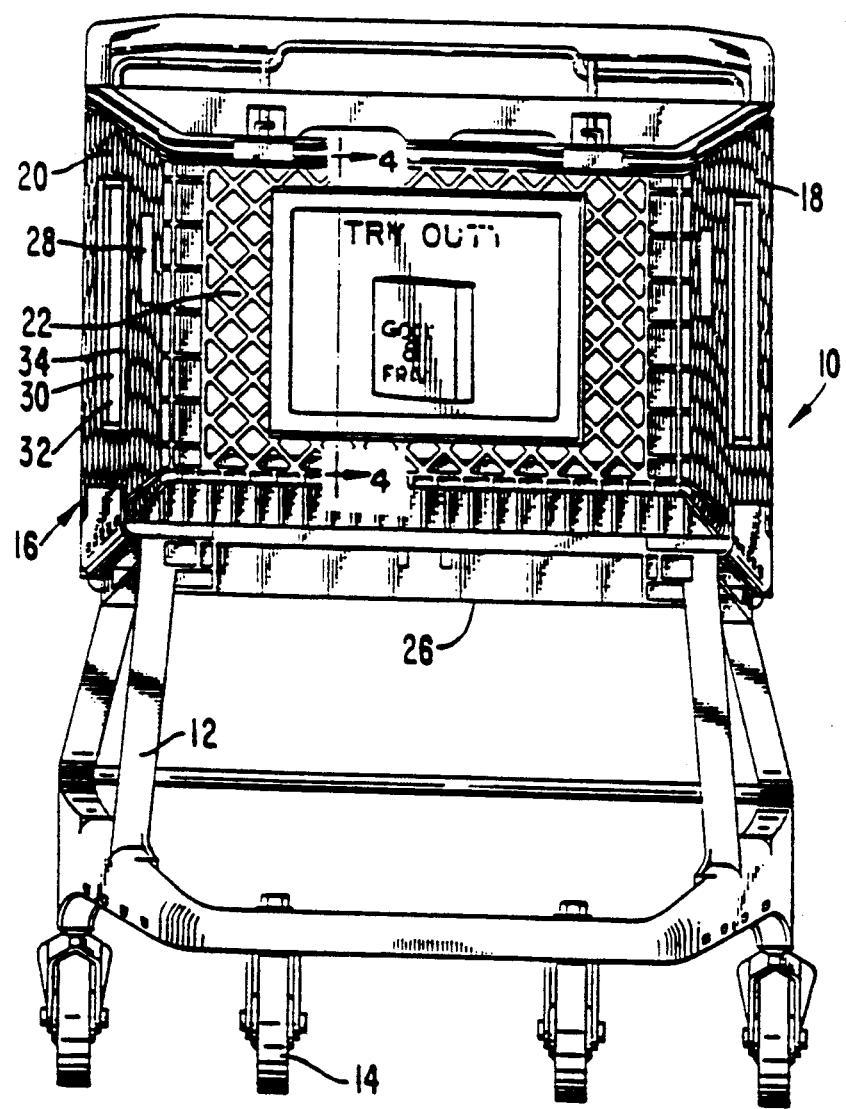
FIG. 2 is a front view of a scanner cart with retrofitted advertising panels mounted on the front wall and molded-in advertising panels on the side walls.

FIGS. 1 and 2 show a scanner type shopping cart having both retrofitted and molded-in advertising panels. Shopping cart 10 has metal cart frame 12 on which wheels 14 are mounted. Plastic basket 16 is mounted on frame 12. Plastic basket 16 can be formed of latticework 18 having any known pattern such as square or diamond. The basket can alternatively be a conventional wire mesh basket. Plastic basket 16 includes two side walls 20, front wall 22, back wall 24 and bottom surface 26. A logo space 28 is formed on one or both side walls 20.

Figure 3:
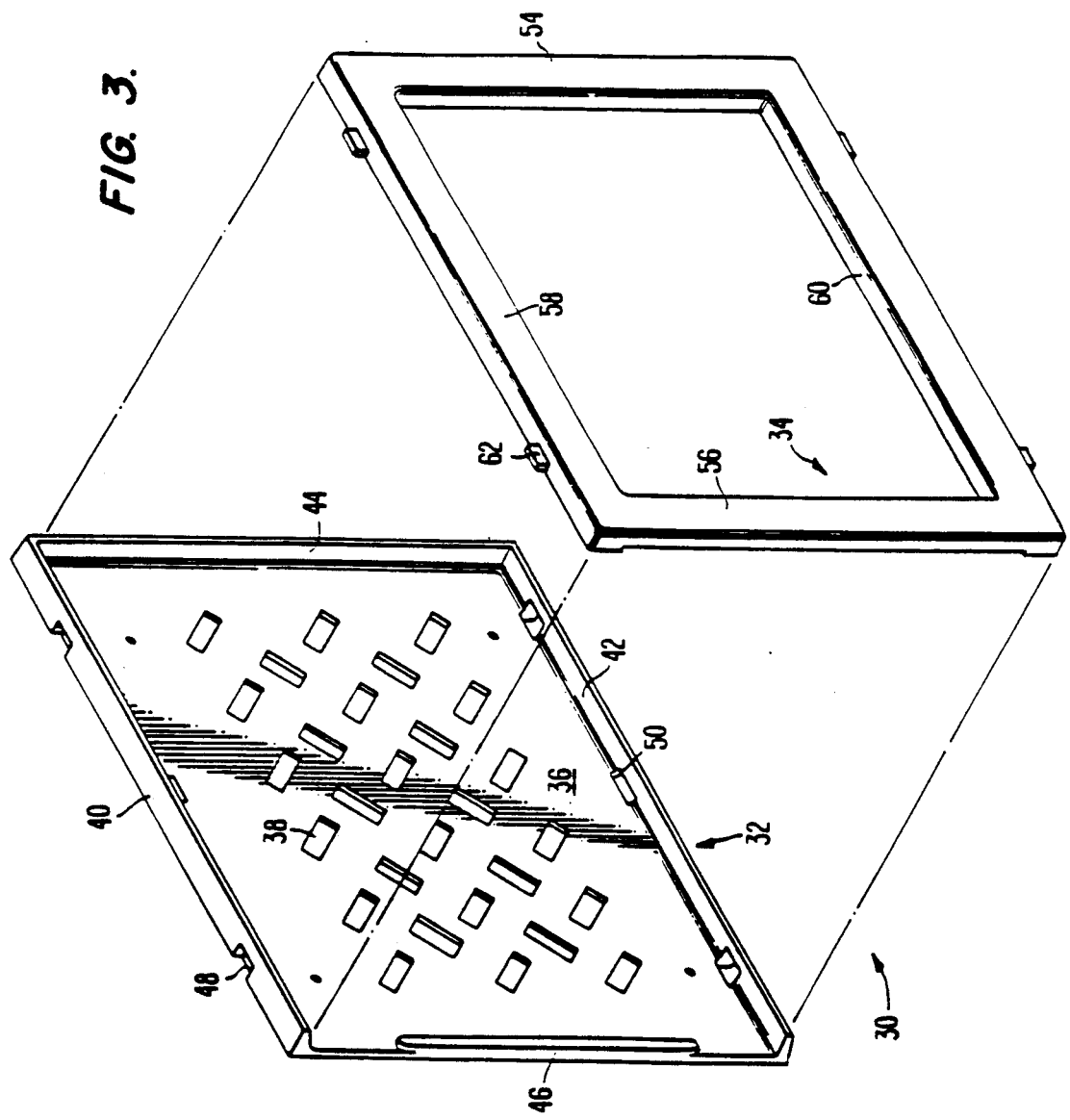
FIG. 3 is an exploded perspective view of the retrofitted advertising panel.
Figure 4:
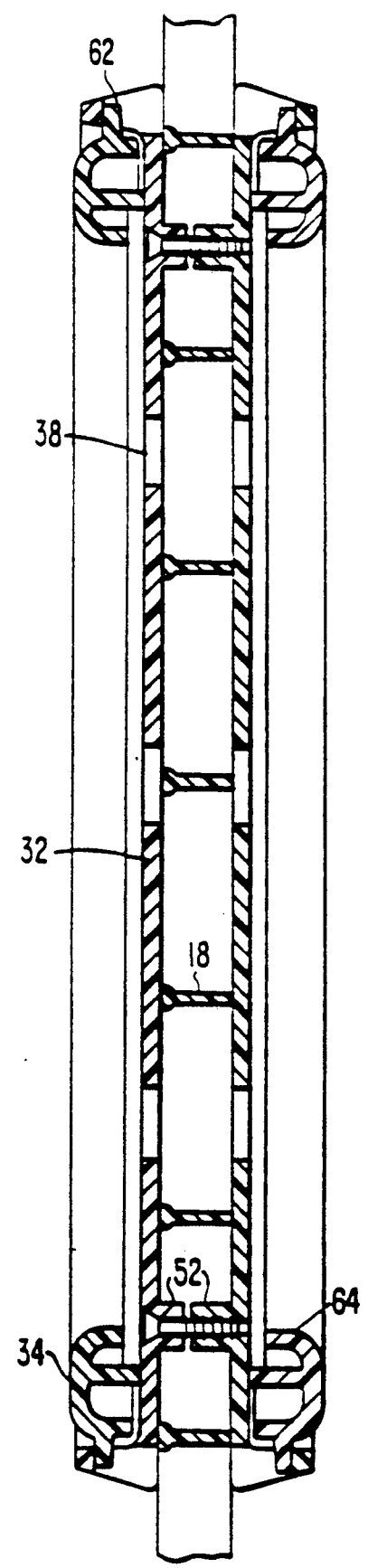
FIG. 4 is a sectional view of the retrofitted advertising panels of FIG. 2 taken along line 4—4.
Figure 5:
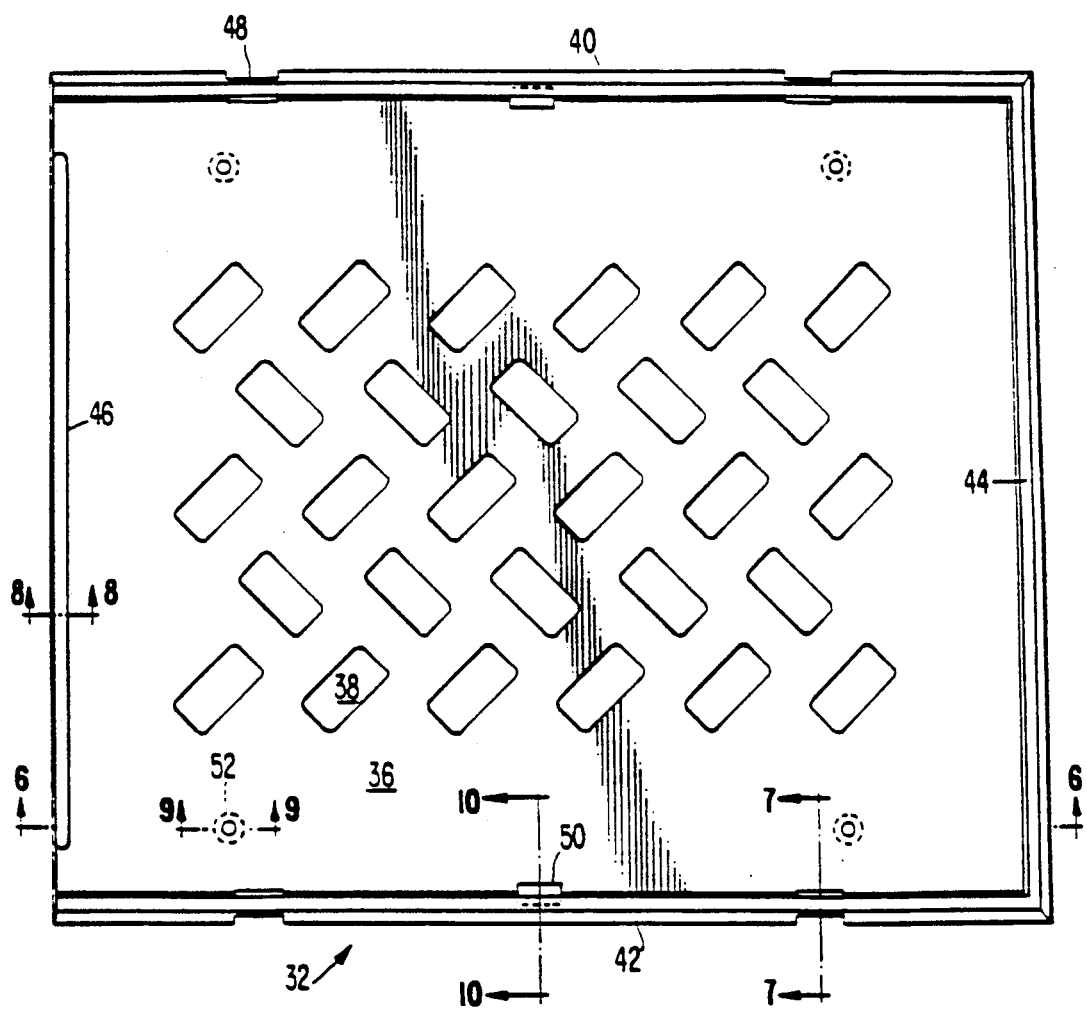
FIG. 5 is a front view of the plate element of the retrofitted advertising panel of FIG. 3.
Figure 6:
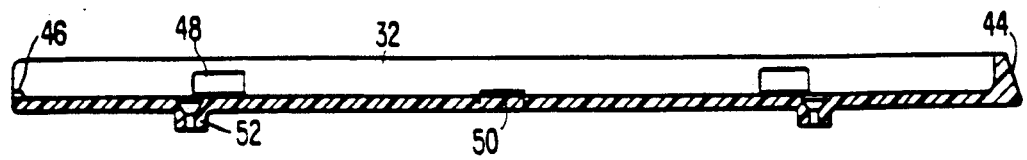
FIG. 6 a sectional view of the plate element of FIG. 5 taken along line 6—6.
Figure 7:
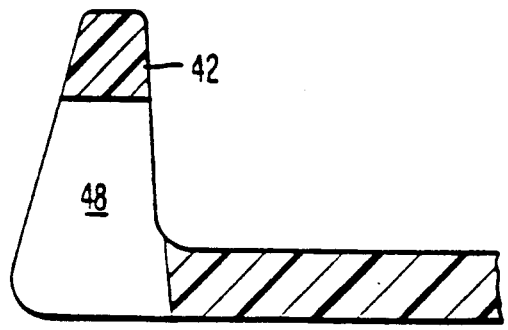
FIG. 7 is a sectional view of the plate element of FIG. 5 taken along line 7—7.
Figure 8:
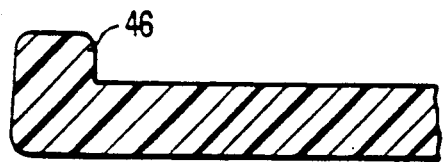
FIG. 8 is a sectional view of the plate element of FIG. 5 taken along line 8—8.
Figure 9:
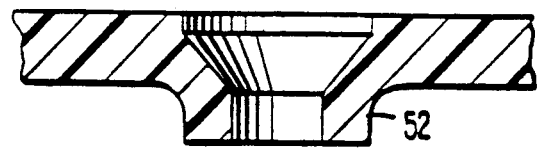
FIG. 9 is a sectional view of the plate element of FIG. 5 taken along line 9—9.
Figure 10:
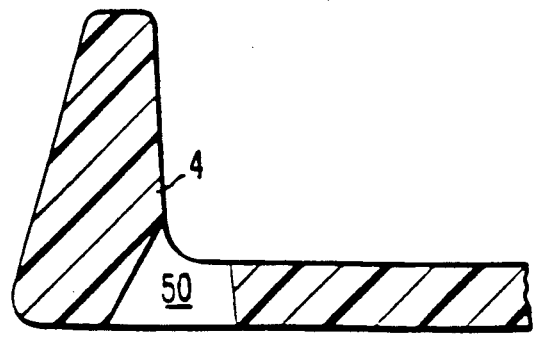
FIG. 10 is a sectional view of the plate element of FIG. 5 taken along line 10—10.
Figure 11:
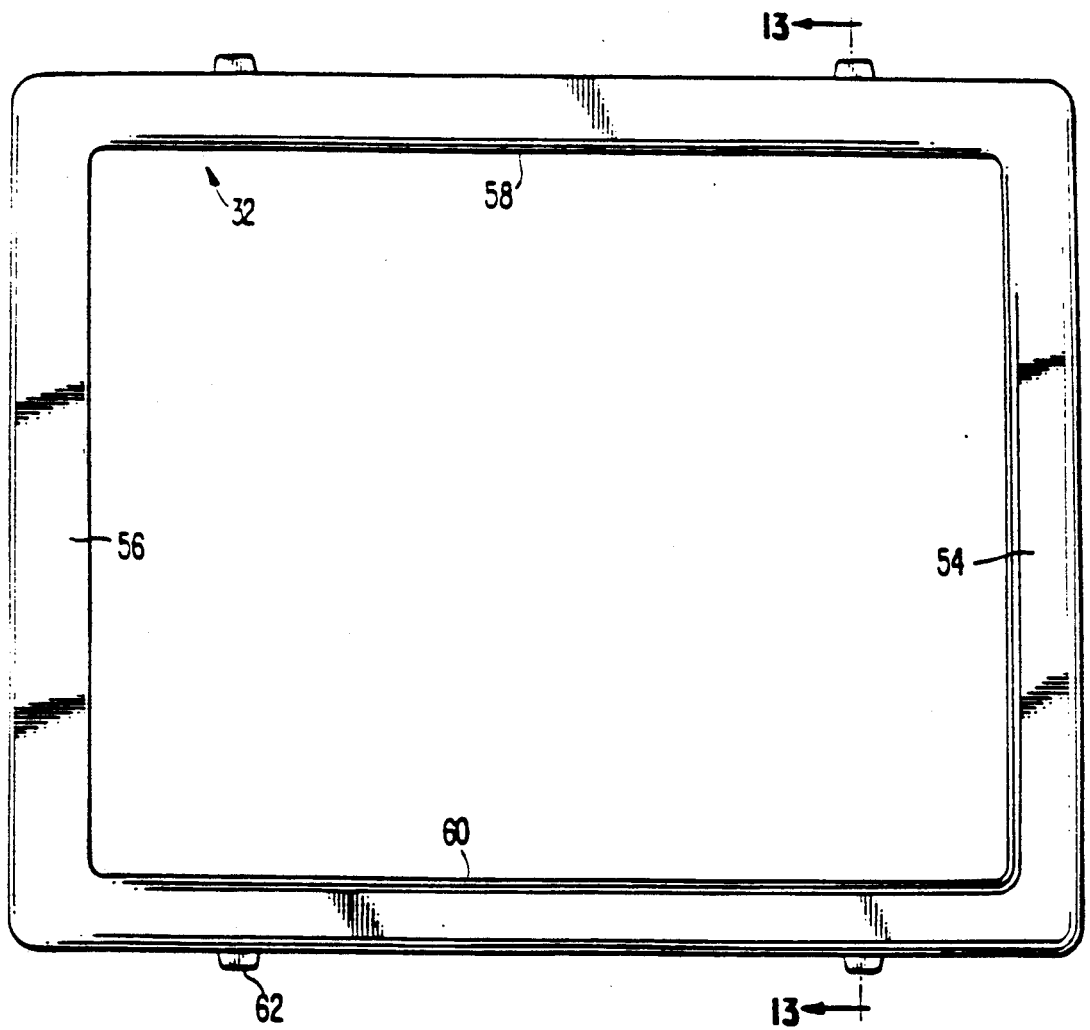
FIG. 11 is a front view of the frame element of the retrofitted advertising panel of FIG. 3.
Figure 12:
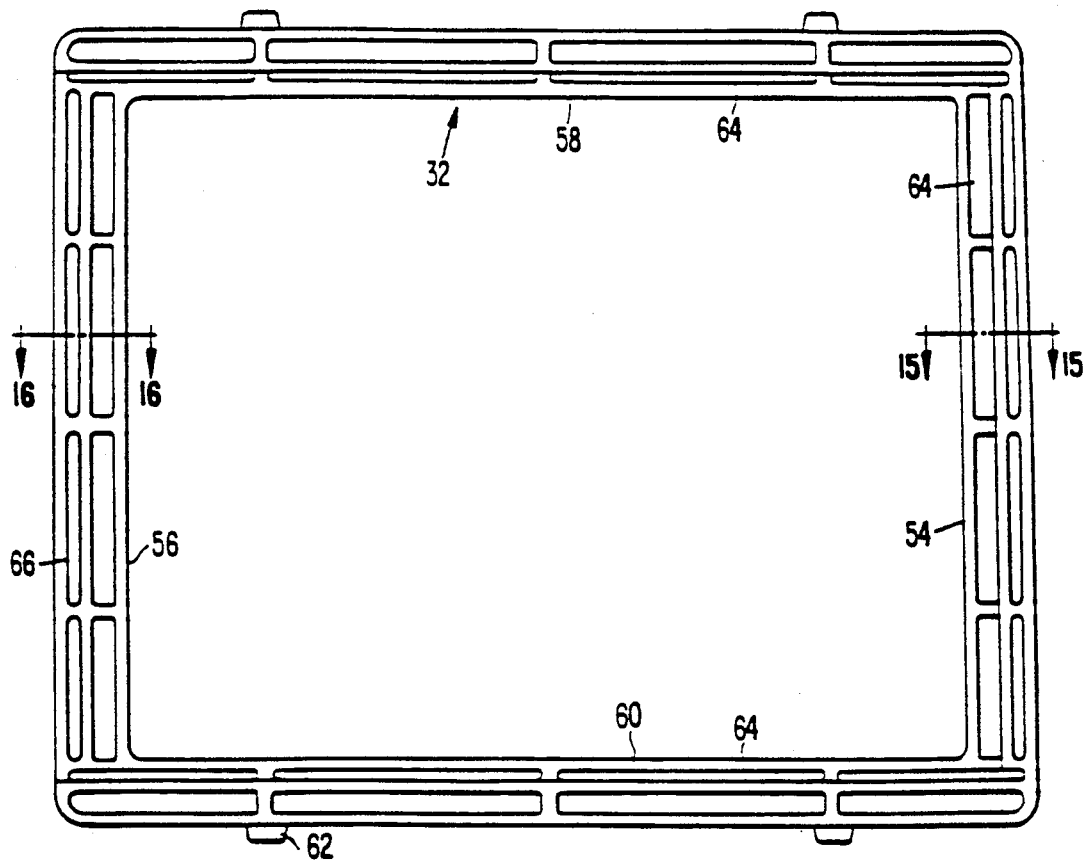
FIG. 12 is a rear view of the frame element of FIG. 11.
Figure 13:
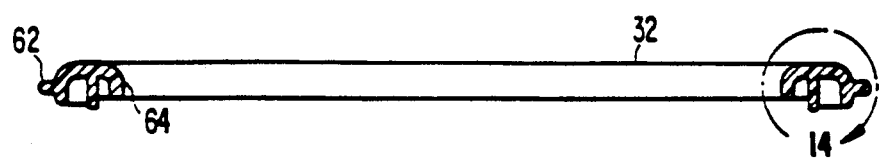
FIG. 13 is a sectional view of the frame element of FIG. 11 taken along line 13—13.
Figure 14:
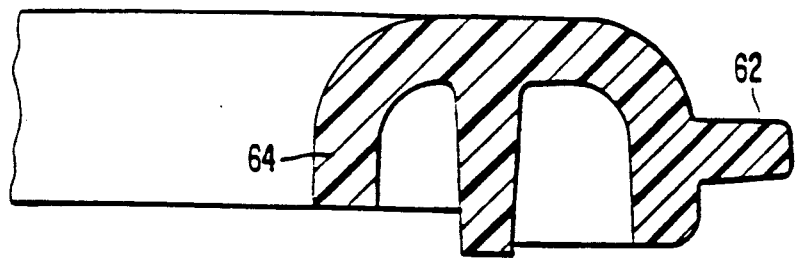
FIG. 14 is an enlarged view of the frame element of FIG. 13 taken on circle 14.
Figure 15:
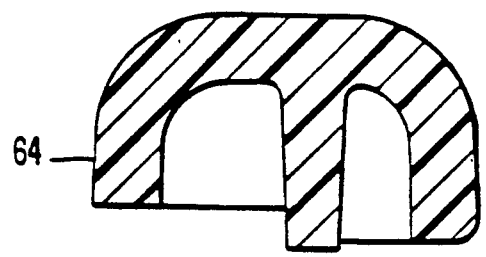
FIG. 15 is a sectional view of the frame element of FIG. 12 taken along line 15—15.
Figure 16:
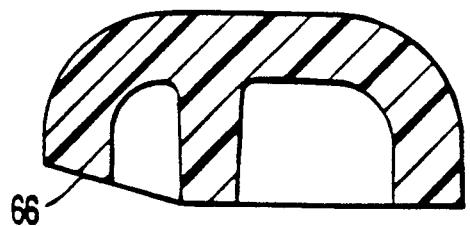
FIG. 16 is a sectional view of the frame element of FIG. 12 taken along line 16—16.
Figure 17:
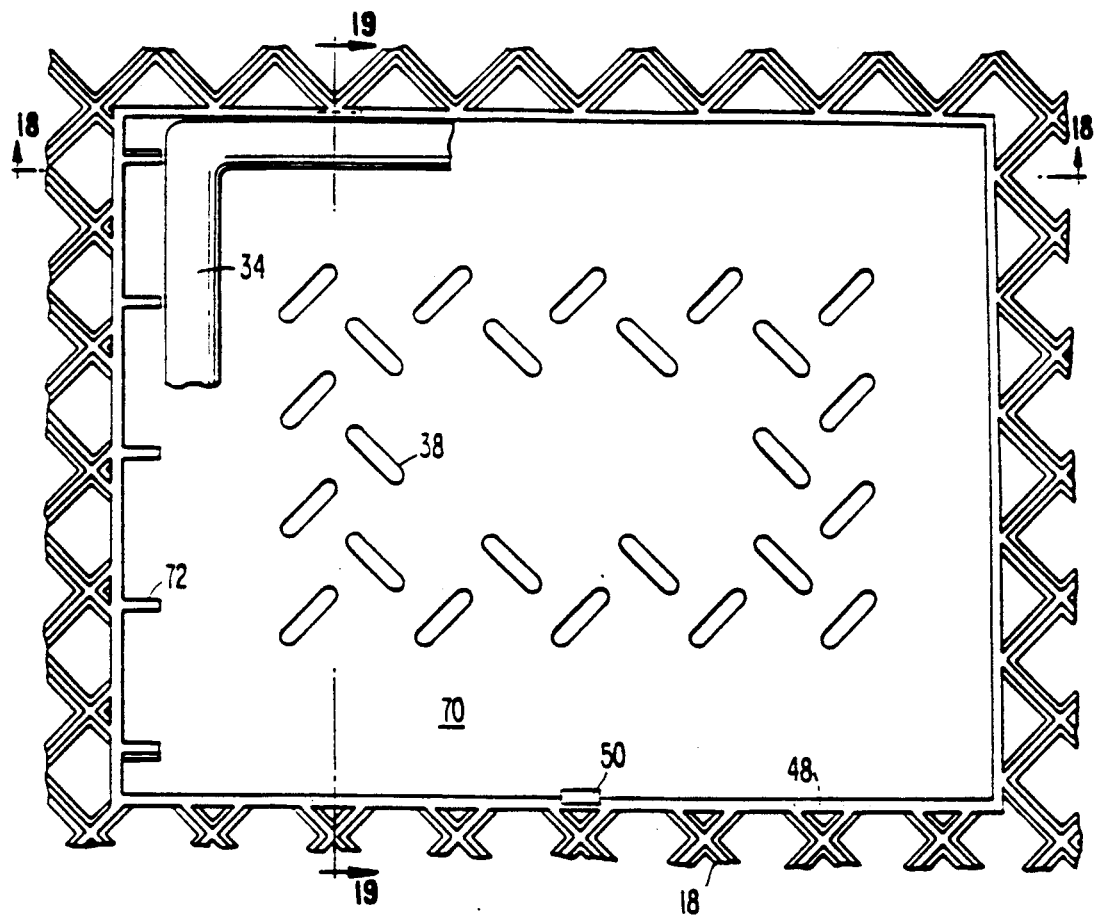
FIG. 17 is a front view of a molded-in advertising panel of the present invention showing the plate portion and a partial view of the frame element.
Figure 18:
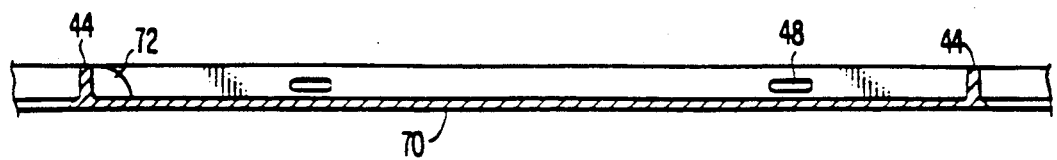
FIG. 18 is a sectional view of the plate portion of FIG. 17 taken along line 18—18.
Figure 19:
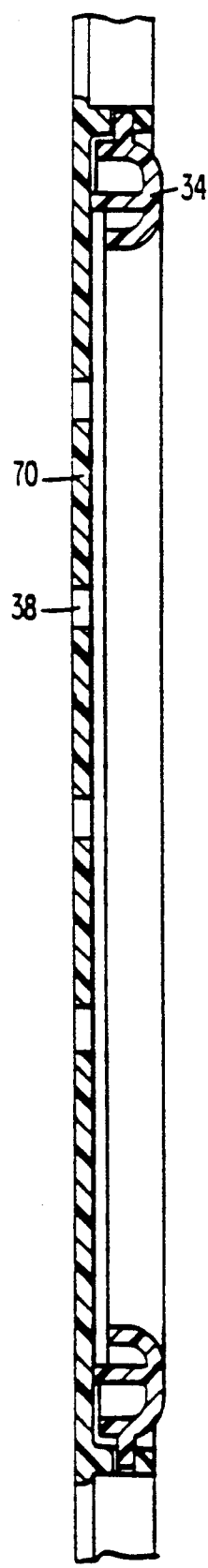
FIG. 19 is a sectional view of the advertising panel of FIG. 17 including the frame element taken along line 19—19.

Retrofitted advertising panel 30 is shown mounted on front wall 22 of basket 16 of shopping cart 10 in FIGS. 2 and 4. Although shown on a plastic scanner shopping cart basket in FIG. 2, retrofitted advertising panels 30 can be mounted on regular, jumbo, mini, and over-the-counter plastic shopping carts also. Additionally, retrofitted advertising panels 30 can be mounted on almost any wire shopping cart basket. Retrofitted advertising panel 30 includes two separate components—a plate element 32 and a frame element 34, as best shown in FIG. 3. Plate element 32, illustrated in detail in FIGS. 5-10, includes rectangular plate 36 made of polyethylene. Plate 36 is formed with a series of apertures, such as oblong holes 38, therethrough. In practice, holes 38 need not be oblong nor disposed in any particular pattern. They also need not cover the entire central region of plate 36. The holes 38 are formed to prevent warping and stress distortion of plate element 32 during the cooling phase of the molding process. The holes 38 are formed preferably in the central portion of plate element 32 and are located so that there are no extended continuous areas of uninterrupted plastic. The holes 38 can be arranged so that most line segments taken from one side of plate 36 to another side and passing through the central region of plate 36 intersect at least one hole 38.

Plate element 32 is formed with edge walls extending around the perimeter and projecting outwardly from the front of plate 36. Top edge wall 40, bottom edge wall 42 and side edge wall 44 are disposed along the entire length of three edges of plate 36. Edge walls 40, 42, 44 are formed with a five degree taper. This assists in the removal of plate element 32 from the mold during molding and creates a more streamlined, integral look for the advertising panel. Edge walls 40, 42, 44 surround frame element 34 along three sides. The edge walls strengthen plate element 32 and shield the sides of frame element 34. Top edge wall 40 greatly reduces the possibility of moisture dripping onto and damaging the advertisement. The remaining side of plate element 32 serves as the advertisement receiving slot or opening through which advertisements are inserted and removed. Stepped retaining lip 46 is disposed along the majority of this side of plate 36.

Two tab receiving openings 48 are formed in each of top and bottom edge walls 40, 42 and hold frame element 34 in place on plate element 32. Tab receiving openings are formed totally through top and bottom edge walls 40, 42. Additionally, a centrally located drainage hole 50 is disposed along both the top and bottom edges of plate 36. Drainage holes 50 are formed through only the edge of plate 36 at the intersection of edge walls 40, 42. Drainage holes 50 do not extend through and do not provide vertical openings through edge walls 40, 42. Drainage holes 50 permit moisture that enters advertising panel 30 to drain out of the panel. The placement of drainage hole 50 adjacent top edge wall 40 renders plate element 32 symmetrical around its central horizontal axis. Thus, plate element 32 may be used with the advertising receiving opening on its right or left side. If symmetry is not required, then drainage hole 50 disposed adjacent top edge wall 40 need not be formed.

Hollow mounting projections 52 are formed on the back surface of plate element 32 and receive self-tapping screws which secure advertising panels 30 to front wall 22 of shopping cart 10. In practice, two advertising panels 30 are disposed on front wall 22. One panel is disposed in the outside and the other on the inside of front wall 22. Thus, the back surface of plate elements 32 abut each other through front wall 22 and mounting projections 52 on each plate element 32 abut each other. Screws are threaded from one plate element 32, through front wall 22, and into the other plate element 32.

Frame element 34, which is illustrated in detail in FIGS. 11-16, includes first and second side members 54, 56, top member 58, and bottom member 60. Frame element 34 is symmetrical around a central horizontal axis. Tabs 62 are disposed on the side of top and bottom members 58, 60 at locations corresponding to tab receiving openings 48 of plate element 32. Tabs 62 removably fit into tab receiving openings 48 to secure frame element 34 to plate element 32. Frame element 34 fits within edge walls 40, 42, 44. The undersides of top member 58, bottom member 60 and first side member 54 are formed with shortened inside portions 64 to receive advertisements thereunder. This secures the advertisements in advertising panel 30. The depth of second side member 56 is less than that of top, bottom, and first side members 58, 60, 54. The outside portion of the underside of second side member 56 is sloped or tapered upwardly in a direction extending outwardly. This sloped surface 66 facilitates insertion and removal of advertisements between plate element 32 and frame element 34. Thus, frame element 34 need not be removed or dislodged from plate element 32 to insert or remove advertisements.

Figure 21:
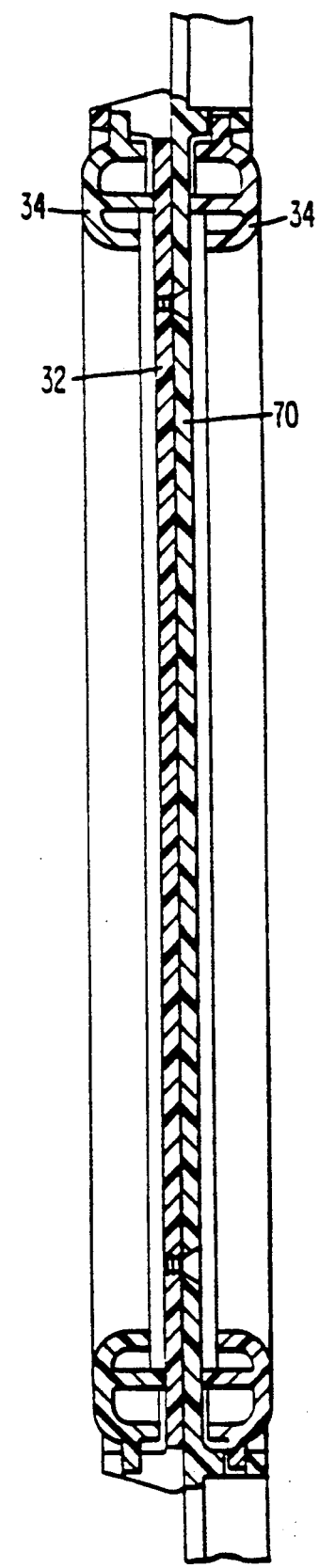
FIG. 21 is a sectional view of the advertising panels of FIG. 20 taken along line 21—21.
Figure 22:
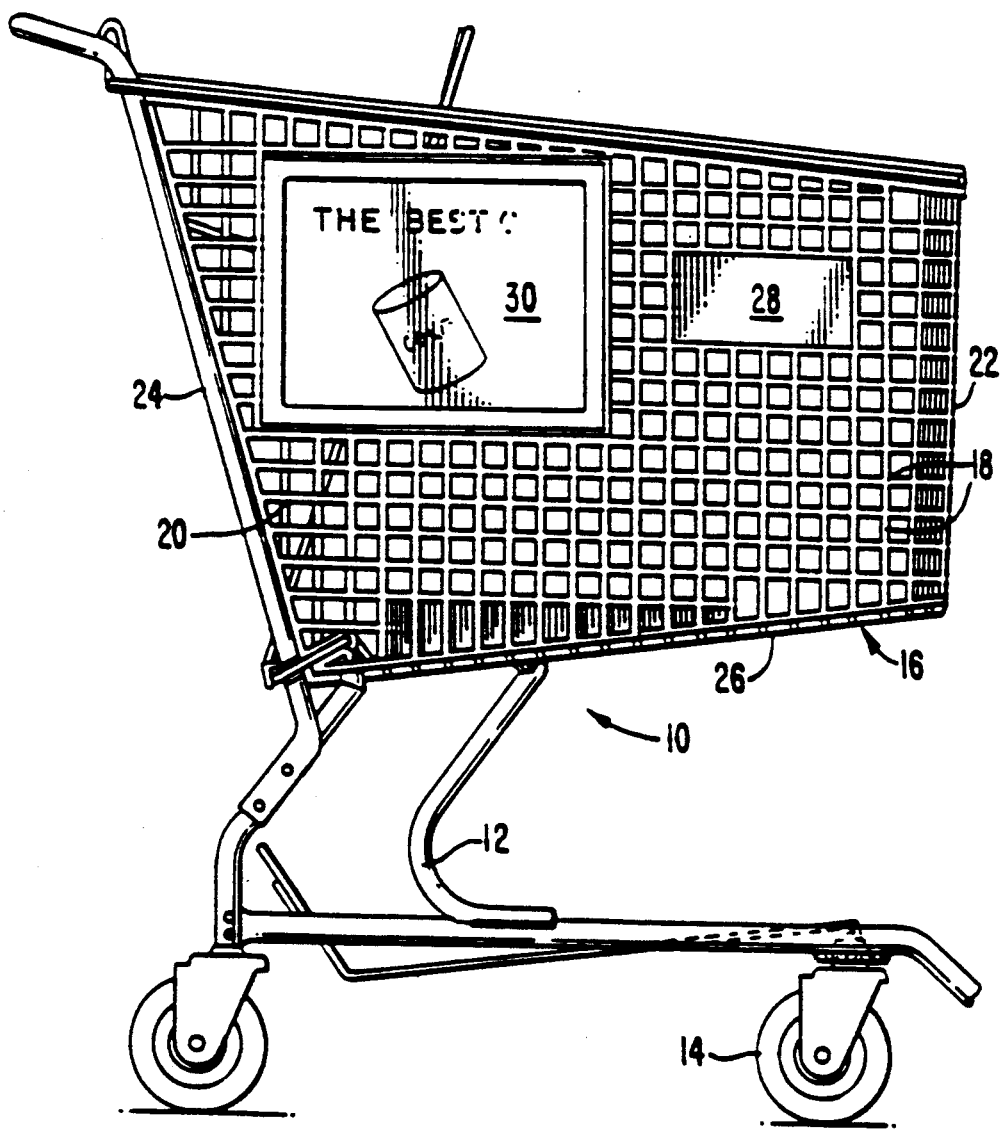
FIG. 22 is a side view of a conventional cart with molded-in advertising panels of the present invention.
Figure 23:
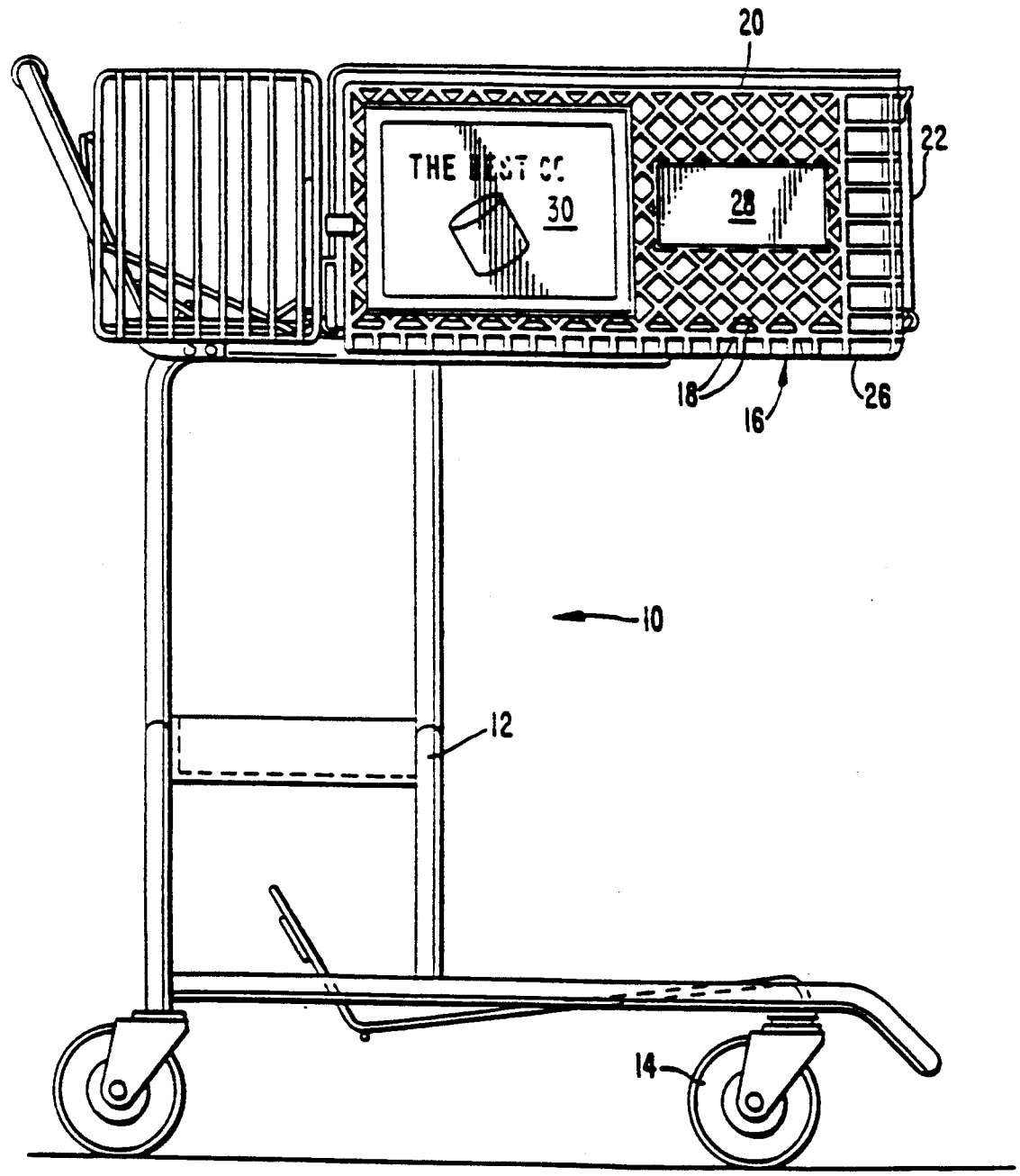
FIG. 23 is a side view of an over-the-counter cart with molded-in advertising panels of the present invention.

FIGS. 1 and 2, 22, and 23 illustrate scanner, regular and over-the-counter shopping carts, respectively, having molded-in advertising panels 30. Molded-in advertising panels 30 are formed not only on the exterior of front wall 22 of shopping carts 10, but also on both side walls 20. Additionally, a retrofitted advertising panel 30 may be fastened to the inside of front wall 22, as shown in FIGS. 20 and 21. In FIGS. 20 and 21, the oblong holes 38 are omitted for clarity. When mounting a retrofitted advertising panel on to a molded-in advertising panel, mounting projections are not necessary. Alternatively, molded-in advertising panel 30 may be formed on the inside of front wall 22 and retrofitted advertising panel 30 fastened to the outside of front wall 22, or molded-in advertising panels 30 may be formed on both sides of front wall 22. Frame element 34 used with molded-in advertising panel 30 is identical to frame element 34 used with retrofitted advertising panel 30. Plate portion 70 performs identical functions to plate element 32 of the retrofitted advertising panel but, because it is molded and formed as part of the walls of basket 16, it has different features.

Plate portion 70, shown in detail in FIGS. 17-21, is integrally formed with walls 20, 22 of plastic basket 16. (For this discussion, it is assumed that plate portion 70 is formed to display advertisements on the outside of front wall 22 only.) The rear or inwardly facing surface of plate portion 70 is formed flush with the inner surface of walls 20, 22. The front or outwardly facing surface of plate portion 70 is recessed from the outer surface of walls 20, 22. When frame element 34 is positioned on plate portion 70, it too is recessed from the outer surface of walls 20, 22. Plate portion 70 is formed on the upper rear portion of side walls 20, and logo space 28 is formed toward the front of side walls 20. This permits advertisements within advertising panel 30 to be visible even when the shopping carts 10 are nested. Plate portion 70 is also formed with a series of apertures such as oblong holes 38. Because, regarding at least advertising panels 30 molded in side walls 20, oblong holes 38 will be exposed to the interior of basket 16, they are formed preferably with a maximum width of only 0.25 inch. This minimizes the number of objects that can extend through oblong holes 38 to damage the advertisement. It also prevents children from poking their fingers in through the holes and tampering with the advertisement. The top, bottom and side edge walls 40, 42, 44 for plate portion 70 are formed by latticework 18 adjacent and surrounding plate portion 70. Tab receiving openings 48 are formed in appropriate locations in top and bottom edge walls 40, 42. A central drainage hole 50 is formed in bottom edge wall 42 only. Although edge walls are formed around the entire perimeter of molded-in advertising panel 30, additional horizontal ribs 72 are formed on plate portion 70 adjacent the side of the plate portion that serves as the advertisement receiving opening.

FIGS. 24-32 illustrate generally at 80 an alternative, preferred retrofit advertising panel assembly of the present invention. As will be apparent to one skilled in the art, many of the novel features therein can be readily adapted to a molded-in design. The advertising panel assembly 80, as shown for example in FIG. 24, generally includes a plate element or member 82 and a frame element or member 84. Although this assembly design embodies the general concepts of some of the previously-described designs, there are a number of improved differences.

The plate member 82 has a front side 86, a rear side 88, peripheral walks 90, 92, 94 along three sides, and a stepped retaining lip 96 positioned at the fourth side 98. The front side 86 is a rectangular flat plate element having a plurality of rows of oblong holes 100. As pictured there are five alternating rows wherein the outer and center rows 102, 104, 106 each have six oblong shaped holes and the middle two rows 108, 110 each have five oblong holes. These holes 100 assist in the cooling formation of the plate member 82, as was previously discussed. Central drainage holes 111 are also provided.

Figure 25:
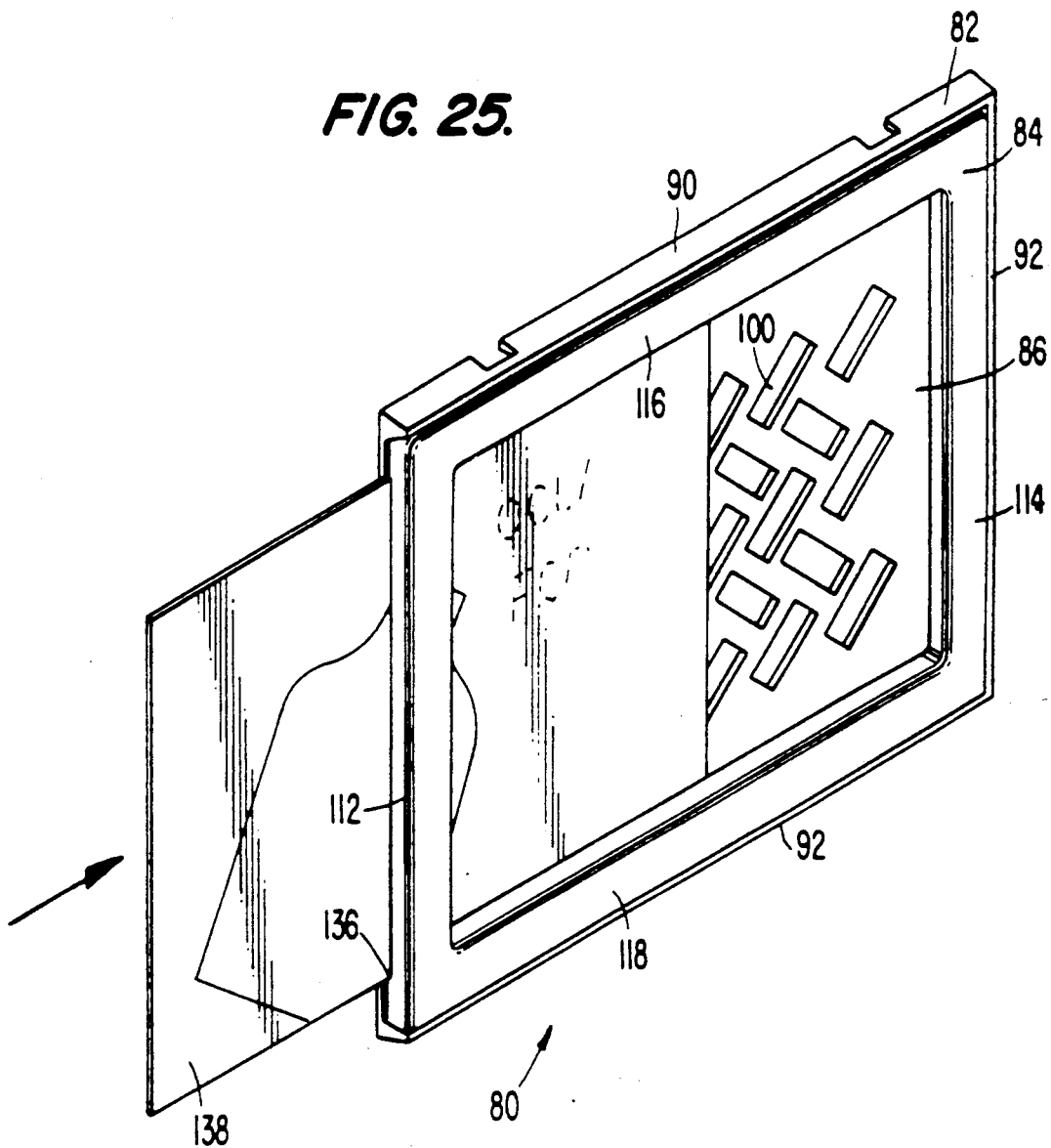
FIG. 25 illustrates the plate and frame members of FIG. 24 in their held together position and with an advertisement card shown being inserted thereinto (or removed therefrom).
Figure 26:
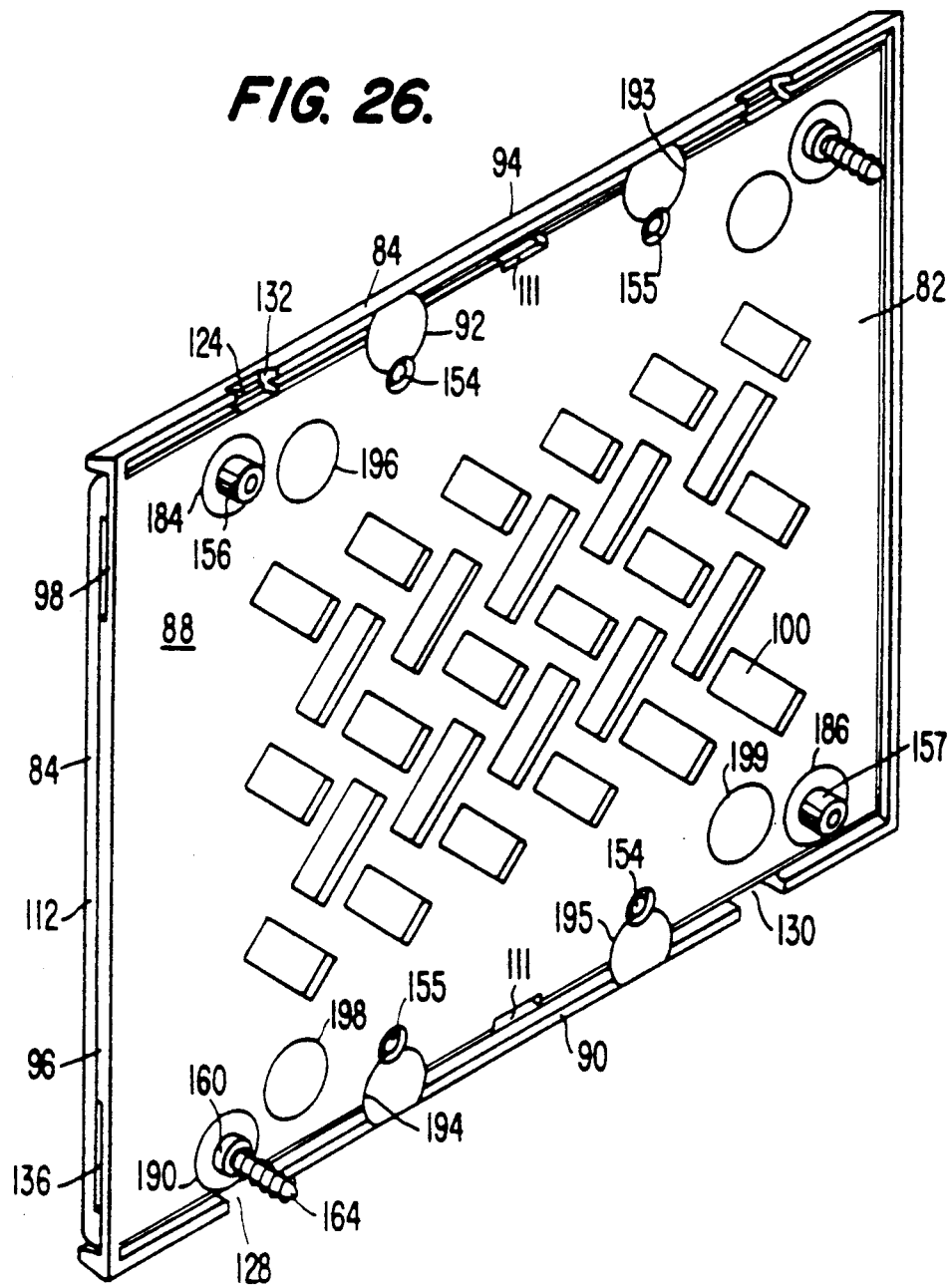
FIG. 26 is a rear perspective view of the snap-held together plate and frame members of FIG. 25.

The frame member 84 is formed by a pair of side frame elements 112, 114, a "top" frame element 116 and a "bottom" frame element 118. Tabs 120, 122, 124, 126 project perpendicularly out from the "top" and "bottom" frame elements 116. 118, are integrally molded therewith and are adapted to fit into corresponding slots 128, 130, 132, 134, respectively, in the top and bottom walls 90, 94 of the plate member 82. The tabs 122, 126 furthest from the fourth side 98 (the side of the stepped retaining lip 96) are wider than the closer tabs 120, 124. This aids in the snap fit of the members and the manipulation of the advertising display card (see FIG. 25). The tabs of the frame member 84 easily snap into and out of the corresponding slots in the plate member 82 to releasably secure the frame member to the plate member. When the frame and plate members 84, 82 are snapped together in a "held" position, as best shown in FIGS. 25 and 26, an advertising card receiving slot 136 is defined along an end thereof (the fourth side 98) at the stepped retaining lip 96. An advertising card, as shown at 138 in FIG. 25, can then be easily slid into and through the advertising card receiving slot 136 into an advertising card display area disposed between the plate and frame members 82, 84 and encircled (or framed) by the frame elements 112, 114, 116, 118 of the frame member 84.

An alternative design positions or forms the tabs on inner edges of the plate member and the corresponding openings or slots on outer edges of the frame member. This design is much better suited, however, for the retrofit version than the molded-in version.

The advertising card 138 has length and width dimensions slightly greater than the framed opening shown generally at 140 defined by the frame member 84 so to be retained therein. More particularly, the backside of the frame member 84, as shown in FIGS. 27-31, includes an inner framing portion 142 around the circumference of the opening 140 and having its surface recessed out from the plate member 82 when in the held position. This framing portion 142 is defined by an inner rib 144 extending around the opening 140. Raised or rearwardly extending frame portions 146, 148, 150 then extend around the top, the bottom and the side, respectively, of the frame member 84 and block the advertising card 138 (FIG. 25) from sliding out of the advertising card display position in a direction other than that of the slot 136. The card 138 cannot freely slide out of the remaining side 98 because of the stepped retaining lip 96 and the central stepped portion 152 of the elongated strip 153 which is shown in FIGS. 28 and 31.

Referring to FIG. 26, the rear side 88 of the plate member 82 has four hollow, rearwardly extending projections 156, 157, 158, 160 positioned generally at each of the four corners thereof. Preformed holes extend through these projections and through the front side 86 of the plate member. Screws, such as flat-tipped machine screws 162, 164, 166, 167, can be screwed in through these openings when two similar plate members 82 and 82a (elements for plate member 82a which are similar to those of plate member 82 have the same reference numeral followed by an "a") are aligned in back-to-back relation as shown in FIG. 32. According to this design the projections 156, 158 (and 156a and 158a) of the plate member 82 (and 82a) which receive the ends of the screws are longer than those through which the screws are initially screwed to ensure a good holding grip to the opposite or held plate member. Thus, the longer projections provide additional screw threads in the member to be attached for relative secure attachment. Similarly, recesses 168, 170 are provided in the front side 86 of the plate member 82 diagonally positioned for receiving therein the heads of the screws 164, 162. Only small holes 176, 178 are formed at the other two corners for receiving the pointed tips of the screws 167, 166 passing from the opposite plate member 82a. The plate members 82 and 82a thereby can be secured to one another and on opposite sides of a wall of a shopping cart as has been previously described (see, e.g., FIGS. 4 and 21).

Figure 24:
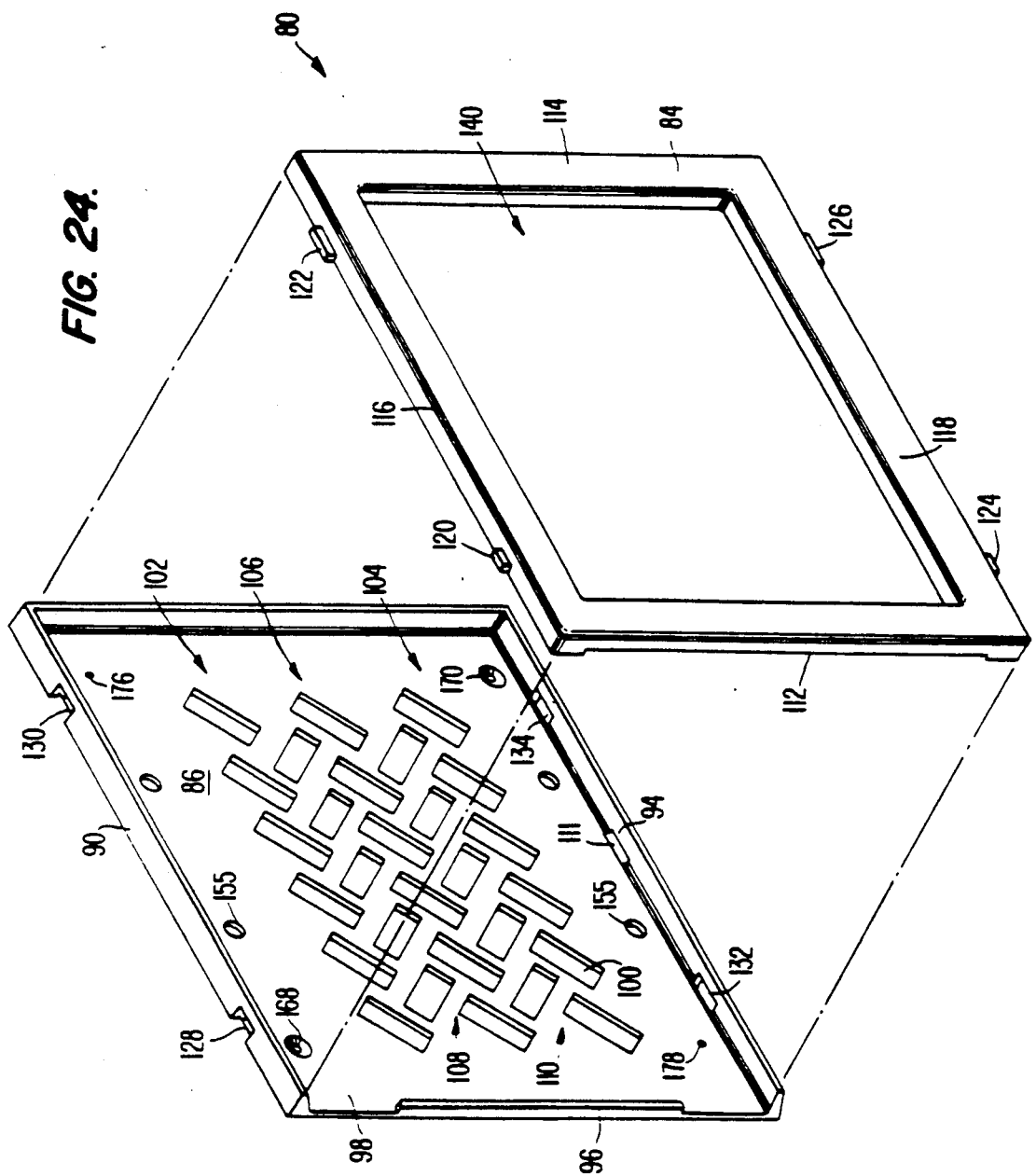
FIG. 24 illustrates plate anti frame members in exploded relation of another advertising panel embodiment of the present invention.

Four projections 154 and four openings 155 are provided to prevent the advertisement display cards from slipping down out of the window area or framed opening 140 defined by the frame member 84. Projections 154 extend rearwardly from the middle ribs or frame portions 146 and 148, as seen in FIGS. 27 and 30. The projections 154 comprise plastic protrusions integrally formed with the frame member 84. The openings 155 are manufactured to extend through the plate member 82, as seen in FIGS. 24 and 32. The projections 154 are sufficiently long and the holes 155 matingly positioned so that the projections extend beyond the front surface of the plate member 82 and into the holes when the two members are snap-held together. This interfitting relation is best shown in FIG. 26. By this means, advertisement display cards cannot (downwardly) slip beyond the protrusions 154 and thereby remain securely in place. This protrusion/hole design can, of course, be used for both the retrofit and molded-in panel designs of this invention.

This diagonal and identical orientation of the projections 156, 157, 158, 160 allows for both of the plate members 82, 82a to be identical and merely differently oriented and facing. Also, assembly thereof is easier since the assembly personnel need not distinguish between the inside and outside plate members 82, 82a. Similarly, the frame members 84 for the inside and outside plate members are identical. The fact that identical parts can be used for both the front and the back makes the manufacture thereof cheaper since only a single mold design is required. Also, installation is easier since it is not required to ship and mate different styles of frames and plates.

As can be seen in FIGS. 26 and 31, each of the projections 156, 157, 158, 160 is surrounded by imprints of circles 184, 186, 188, 190, respectively, which correspond to a molding step. Additional pits or circular imprints are provided along the top and bottom, wherein the middle imprints 192, 193, 194, 195 engage the top and bottom edges of the plate member 82 and the outer imprints 196, 197, 198, 199 are spaced inwardly from the edges. The mold (not shown) for the plate member 82 has the capability of cutting the long steel rods thereof (not shown) to form the holes at any of these circular locations or imprints. Thus, any combination of projection holes can be readily used to accommodate different sizes of shopping carts. In other words, these additional imprints provide flexibility for changes in molding for panels for different (front) shopping cart walls.

Numerous characteristics, advantages and embodiments of the present invention(s) have been described in detail in the foregoing description with reference to the accompanying drawings. However, the disclosure is illustrative only, and the invention is not limited to the illustrated embodiments. Various changes and modifications may be effected therein by one skilled in the art without departing from the scope or spirit of the invention.

What is claimed is:

1. A basket wall placard display assembly, comprising:
   a basket wall having a wall opening, a wall exterior face and a wall interior face; and
   a display card retainer assembly secured to the wall at the wall opening and including a rear. Side generally flush with said wall interior face and a front side recessed at least in part from said wall exterior face so that the retainer assembly is disposed between said interior and exterior wall faces, said display card retainer assembly including (a) slot means through which a display card passes into and out of a display card display position and (b) retaining means for at least partially encircling the display card display position, at least partially defining a display card window frame, and at least partially retaining in the display position a display card inserted thereinto through said slot means.

2. The assembly of claim 1 wherein said wall opening comprises a through-opening intersecting both said wall exterior and interior faces.

3. The assembly of claim 1 wherein said basket wall comprises a plastic latticework basket wall.

4. The assembly of claim 3 wherein said display card retainer assembly is molded to said plastic latticework basket wall.

5. The assembly of claim 1 wherein said display card retainer assembly comprises a plate member to which said retaining means is securable.

6. The assembly of claim 5 wherein said retaining means comprises a frame member and said display card retainer assembly comprises snap fastening means for releasably snap fastening said plate member and said frame member together.

7. The assembly of claim 5 wherein said retaining means comprises a frame member and said slot means is disposed between and defined by said plate and frame members.

8. The assembly of claim 5 wherein said retaining means includes at least in part an upright wall extending from said plate member.

9. The assembly of claim 8 wherein said retaining means further includes an inwardly disposed lip and means for attaching said lip to said wall.

10. The assembly of claim 8 wherein said plate member has four perimeter edges and said upright wall is formed on three of four perimeter edges of said plate member.

11. The assembly of claim 10 wherein said slot means is defined on the fourth perimeter edge.

12. The assembly of claim 11 wherein said display card retainer assembly includes a stepped retaining lip on the fourth perimeter edge.

13. The assembly of claim 5 wherein said plate member is integrally formed of plastic with said basket wall such that said plate member is encircled by said basket wall.

14. The assembly of claim 1 wherein said basket wall defines a front wall of a carrying basket.

15. The assembly of claim 1 wherein said basket wall defines a side wall of a carrying basket.

16. The assembly of claim 1 wherein said basket wall has an open latticework construction.

17. The assembly of claim 16 wherein said basket wall is constructed of plastic.

18. A basket wall display card assembly, comprising:
   a basket wall having interior and exterior wall faces and an advertising panel opening therethrough;
   a base plate secured in and within said opening;
   elongated lip structure secured on said base plate and defining generally therewithin a display card display area;
   retaining means associated with said lip structure for retaining a display card in the display card display area; and
   at least one said base plate, said lip structure and said retaining means, and with said retaining means in place relative to said base plate, defining at least in part an elongated display card slot through which a display card can be passed for insertion into and removal from the display card display area.

19. An advertisement panel basket, comprising:
   a latticework basket wall having interior and exterior wall faces;
   a plate member having interior and exterior surfaces secured to said wall so that the plate interior surface is generally flush with said interior face of said wall;
   a frame member separable from said plate member; and
   snap fastening means for snap fastening said frame member to said plate member into a relative held position adjacent the plate member exterior face and recessed from said exterior wall surface;
   wherein said plate and frame members, when in the held position, define generally therebetween an advertisement card receiving slot and an advertisement card display area; and
   wherein said advertisement card display area is positioned for receiving therein, into an advertisement card display position, and advertisement card inserted into said advertisement card slot and for removal of an advertisement card from the advertisement card display position out through said advertisement card slot.

20. The basket of claim 19 wherein said wall is molded from plastic.

21. A basket wall placard display assembly, comprising:
   a latticework basket wall having a wall exterior face and a wall interior face, said basket wall comprising latticework wall material encircling an area void of said material; and
   a display card retainer assembly securable in said area and generally flush with said wall exterior interior face, said display card retainer assembly including (a) slot means through which a display card passes into and out of a display card display position and (b) retaining means for at least partially encircling the display card display position, at least partially defining a display card window frame, and at least partially retaining in the display position a display card inserted therein through said slot means.

22. A basket wall display card assembly, comprising:
a latticework basket wall having interior and exterior wall faces;
a base plate secured in and generally encircled by said basket wall and at least partially recessed in from said exterior wall face;
elongated lip structure secured on said base plate and defining generally therewithin a display card display area;
retaining means associated with said lip structure for retaining a display card in the display card display area; and
at least one said base plate, said lip structure and said retaining means, and with said retaining means in place relative to said base plate, defining at least in part an elongated display card slot through which a display card can be passed for insertion into and removal from the display card display area.

23. An advertisement panel basket, comprising:
a latticework basket wall having an exterior face and a securement area generally recessed in from said exterior face;
a frame member separable from said securement area; and
snap fastening means for snap fastening said frame member to said securement area into a relative held position;
wherein at least one of said securement area and said frame member, when in the held position, define an advertisement card receiving slot and an advertisement card display area; and
wherein said advertisement card display area is positioned for receiving therein, into an advertisement card display position, an advertisement card inserted into said advertisement card slot and for removal of an advertisement card from the advertisement card display position out through said advertisement card slot.

24. The basket of claim 23 wherein said wall is molded from plastic.

25. The basket of claim 23 wherein said securement area comprises a plate.

26. The basket of claim 25 wherein said plate comprises a plastic sheet member.

27. The basket of claim 23 wherein said securement area and surrounding portions of said wall are integrally formed together.

28. A nestable basket comprising at least one sidewall comprising latticework and including inner and outer sidewall surface planes; an advertising display panel supported in the sidewall substantially between the sidewall surface planes, said display panel comprising a support portion permanently attached to the sidewall and having an inner surface not extending beyond the inner sidewall surface plane and an outer surface recessed from the outer sidewall surface plane; a retainer means recessed from the outer sidewall surface plane for retaining an advertising placard adjacent the outer surface of the support portion; said support portion having a peripheral boundary area and said retainer means comprises a frame member including a central open display window substantially coextensive with at least part of the support portion peripheral boundary area; said retainer means defining an open passage slot disposed between the sidewall surface planes for permitting movement of an advertising placard towards and away from the outer surface of the support portion.

29. A basket as claimed in claim 28, wherein said inner surface of said support portion is substantially coextensive with said inner sidewall surface plane.

30. A basket as claimed in claim 28, including upright edge walls extending from the support portion peripheral area towards the sidewall outer surface plane, said edge walls defining a placard display area on said support portion, said retainer means disposed within said edge walls.

31. A basket as claimed in claim 30, said edge walls and retainer means including cooperating securing means for removably securing the retainer means within the edge walls.

32. A basket as claimed in claim 31, said securing means comprising a snap-fitting securing means.

33. A basket as claimed in claim 30, wherein said passage slot comprises a recess in one side of the frame member.

34. A basket as claimed in claim 28, wherein said frame member is substantially coextensive with the entire support portion peripheral boundary area and wherein said passage slot comprises a recess in one side of the frame member.

35. A basket as claimed in claim 28, including an array of openings located in an area traversing the majority of the surface of said support portion.

36. A basket as claimed in claim 35, wherein said support portion constitutes an extension of said one sidewall.

37. A basket as claimed in claim 28, wherein said support portion constitutes an extension of said one sidewall.

38. A basket as claimed in claim 28, wherein said frame is separable from the display panel.

39. A nestable basket as claimed in claim 28, wherein said basket is sized for nesting front to rear with a similar basket having similar advertising display panels; said advertising display panel being disposed at the rear portion of said sidewall, whereby said advertising display panel is exposed at least in part when the basket is nested with similar baskets.

40. A nestable basket as claimed in claim 39, wherein said advertising display panel is disposed at the upper rear portion of said basket.

* * * * *